(12) United States Patent
Chen

(10) Patent No.: US 11,831,167 B2
(45) Date of Patent: *Nov. 28, 2023

(54) PERSISTENT DC CIRCUIT BREAKER

(71) Applicant: Entrantech Inc., Gilroy, CA (US)

(72) Inventor: Kong-Chen Chen, Gilroy, CA (US)

(73) Assignee: Entrantech Inc., Gilroy, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/402,450

(22) Filed: Aug. 13, 2021

(65) Prior Publication Data

US 2023/0050719 A1 Feb. 16, 2023

(51) Int. Cl.
*H02J 4/00* (2006.01)
*H02H 7/20* (2006.01)

(52) U.S. Cl.
CPC .......... *H02J 4/00* (2013.01); *H02H 7/20* (2013.01)

(58) Field of Classification Search
None
See application file for complete search history.

(56) References Cited

U.S. PATENT DOCUMENTS

| | | | |
|---|---|---|---|
| 5,635,773 A * | 6/1997 | Stuart | H02J 9/062 363/71 |
| 5,786,642 A | 7/1998 | Wilhelm | |
| 6,320,359 B1 | 11/2001 | Nagaya et al. | |
| 6,798,666 B1 | 9/2004 | Alexander et al. | |
| 8,148,844 B2 | 4/2012 | Pan | |
| 10,840,735 B1 | 11/2020 | Cooper | |
| 11,183,851 B1 | 11/2021 | Chen | |
| 11,476,657 B2 | 10/2022 | Chen | |
| 11,489,455 B2 | 11/2022 | Chen | |
| 11,605,970 B2 | 3/2023 | Chen | |
| 2004/0085043 A1 | 5/2004 | Germagian et al. | |
| 2005/0225955 A1 | 10/2005 | Grebenkemper et al. | |
| 2005/0237724 A1 | 10/2005 | Fiorentino et al. | |
| 2006/0244620 A1 | 11/2006 | Sotiriou | |
| 2007/0073420 A1 * | 3/2007 | Lanni | H02J 7/00 700/22 |
| 2007/0273210 A1 * | 11/2007 | Wang | H02J 4/00 307/45 |
| 2011/0053394 A1 | 3/2011 | Hood, III et al. | |
| 2012/0118602 A1 | 5/2012 | Remmert | |

(Continued)

FOREIGN PATENT DOCUMENTS

WO   WO-2011035326 A1 *  3/2011   ............... H02J 1/06

OTHER PUBLICATIONS

International Search Report & Written Opinion dated May 3, 2022 (ISA/US) in PCT Application PCT/US2021/059792.

(Continued)

*Primary Examiner* — Daniel Kessie
*Assistant Examiner* — Terrence R Willoughby
(74) *Attorney, Agent, or Firm* — Weaver Austin Villeneuve & Sampson LLP

(57) ABSTRACT

A persistent DC circuit breaker provides a persistent single or dual DC voltage for a power distribution circuit coupled to a power panel. A control mechanism ensures a constant and consistent DC power output from the persistent DC circuit breaker. The persistent DC circuit breaker can replace an AC circuit breaker to convert an AC power panel into a co-existing AC and DC power panel or an entire DC power panel.

20 Claims, 3 Drawing Sheets

(56) References Cited

U.S. PATENT DOCUMENTS

| | | | | |
|---|---|---|---|---|
| 2012/0188806 A1* | 7/2012 | Tamura | ...................... | H02J 3/44 363/95 |
| 2012/0212078 A1* | 8/2012 | Lanni | ........................ | G05F 1/00 307/151 |
| 2013/0015714 A1 | 1/2013 | Kwok | | |
| 2015/0022001 A1 | 1/2015 | Goei et al. | | |
| 2015/0048767 A1 | 2/2015 | Takezawa | | |
| 2015/0054343 A1 | 2/2015 | Cui | | |
| 2015/0348733 A1 | 12/2015 | Shi et al. | | |
| 2018/0212420 A1* | 7/2018 | Chen | ........................ | H02H 7/22 |
| 2018/0226797 A1 | 8/2018 | Galin et al. | | |
| 2019/0081571 A1 | 3/2019 | Chung et al. | | |
| 2019/0229546 A1 | 7/2019 | Hartl | | |
| 2019/0288532 A1 | 9/2019 | Mattos et al. | | |
| 2020/0381917 A1 | 12/2020 | Takeda | | |
| 2022/0014014 A1 | 1/2022 | Chen | | |
| 2022/0052618 A1 | 2/2022 | Chen | | |
| 2022/0052619 A1 | 2/2022 | Chen | | |
| 2022/0094191 A1* | 3/2022 | Suzuki | ....................... | H02J 7/34 |
| 2022/0158482 A1 | 5/2022 | Chen | | |
| 2022/0190638 A1* | 6/2022 | Raju | ........................ | H02J 9/068 |
| 2022/0263427 A1* | 8/2022 | Willson | .................. | H02J 3/381 |
| 2022/0393488 A1 | 12/2022 | Chen | | |

OTHER PUBLICATIONS

U.S. Notice of Allowance dated Jun. 9, 2022 in U.S. Appl. No. 16/950,882.

U.S. Corrected Notice of Allowance dated Jul. 18, 2022 in Application No. 17/398,355.

U.S. Corrected Notice of Allowance dated Jun. 21, 2022 in U.S. Appl. No. 16/950,882.

U.S. Non-Final office Action dated Aug. 24, 2022 in U.S. Appl. No. 17/402,435.

U.S. Notice of Allowance dated Jul. 7, 2022 in Application No. 17/398,355.

U.S. Notice of Allowance dated Feb. 15, 2022 in U.S. Appl. No. 16/950,882.

U.S. Notice of Allowance dated Jul. 27, 2021 in U.S. Appl. No. 17/062,413.

U.S. Notice of Allowance dated Apr. 19, 2023 in U.S. Appl. No. 17/884,984.

U.S. Corrected Notice of Allowance dated Oct. 6, 2022 in U.S. Appl. No. 17/398,355.

U.S. Corrected Notice of Allowance dated Sep. 20, 2022 in U.S. Appl. No. 16/950,882.

U.S. Advisory Action dated Mar. 22, 2023 in U.S. Appl. No. 17/402,435.

U.S. Corrected Notice of Allowance dated Feb. 14, 2023 in U.S. Appl. No. 17/667,457.

U.S. Corrected Notice of Allowance dated Nov. 17, 2022 in U.S. Appl. No. 17/667,457.

U.S. Final office Action dated Jan. 19, 2023 in U.S. Appl. No. 17/402,435.

U.S. Notice of Allowance dated Nov. 3, 2022 in U.S. Appl. No. 17/667,457.

* cited by examiner

FIG. 2  An Exemplary Functional Block Diagram of Persistent Single-DC Circuit Breaker with Protection for Power Distribution Circuit Abnormalities
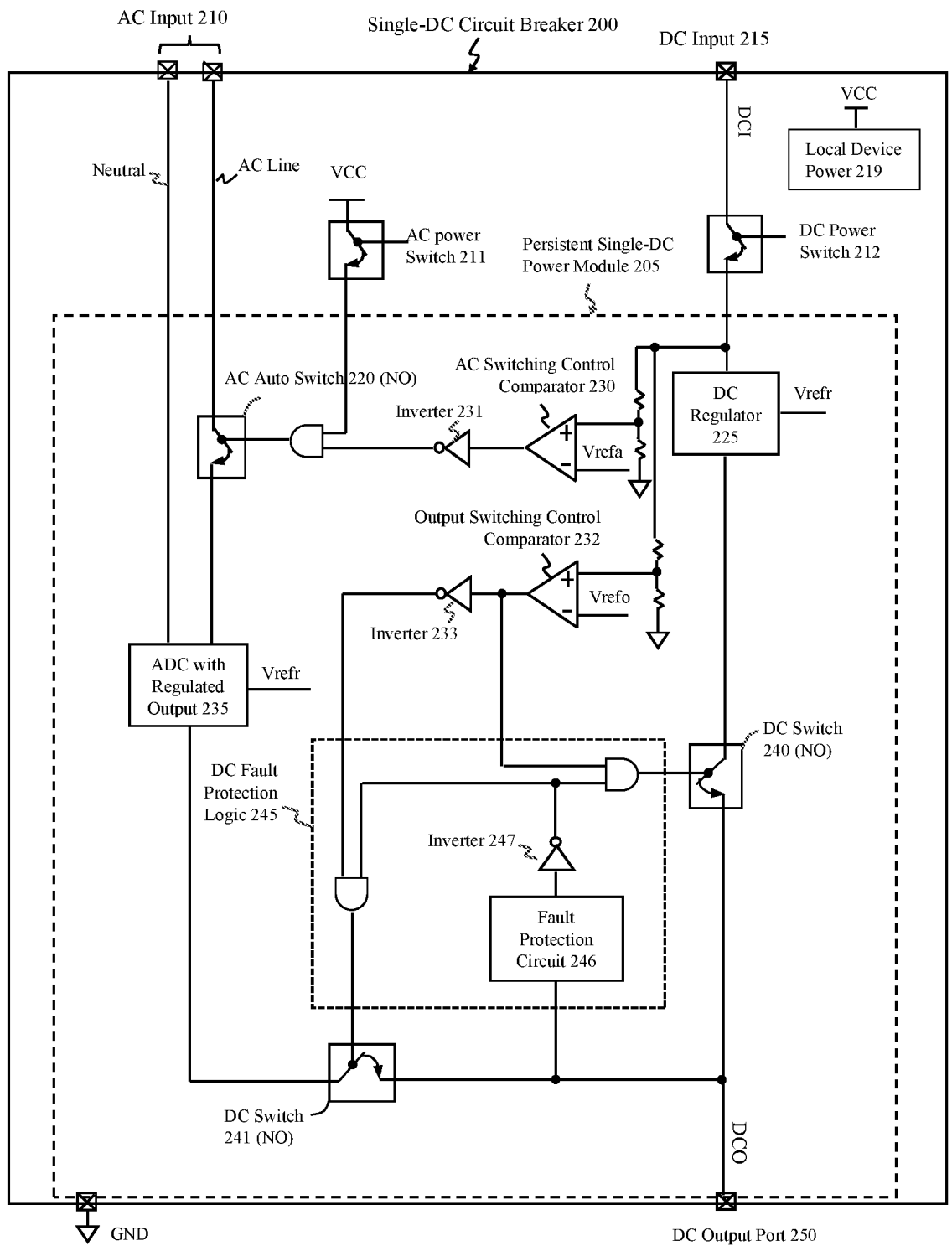

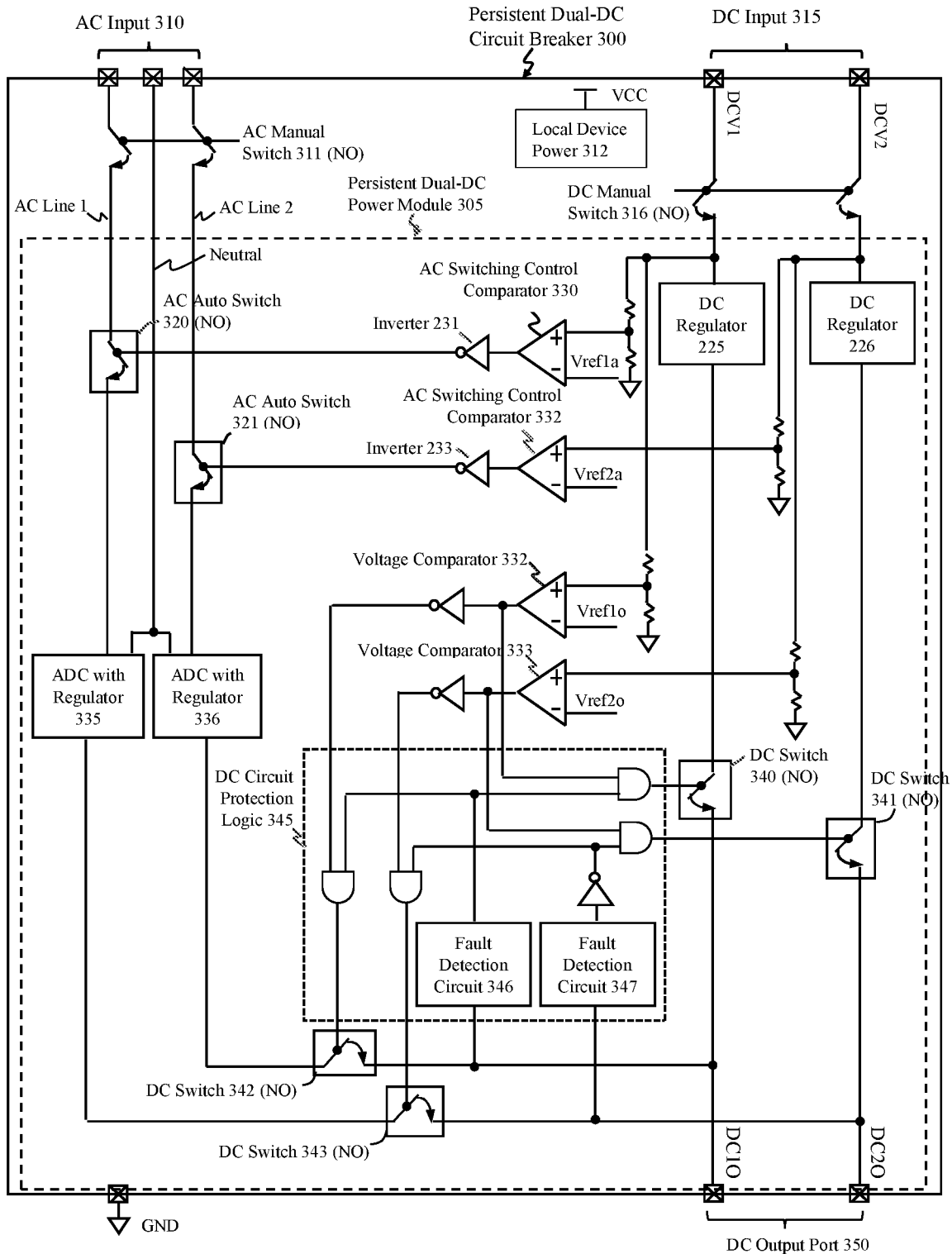
FIG. 3 An Exemplary Functional Block Diagram of Persistent Dual-DC Circuit Breaker with Fault Protection Feature

PERSISTENT DC CIRCUIT BREAKER

FIELD OF THE INVENTION

The present invention relates to an apparatus and method for AC and DC power co-distribution, and more particularly, to configuring a persistent DC circuit breaker for replacement of AC circuit breakers to facilitate an AC and persistent DC co-exiting power panel.

BACKGROUND

An AC power panel connected to AC power includes a multitude of AC circuit breakers to drive AC power distribution circuits. One drawback of existing systems is that almost all electronic devices contain integrated circuits that run on DC power which is not directly available from an AC power distribution circuit. A power adaptor is therefore required to convert the AC power into DC. To have DC power directly available on a power distribution circuit that enables electronic devices, such as mobile phone or laptop, to directly access DC power from a power distribution circuit without using power adaptor is very useful. A power panel that can provide DC power for electric devices to use and also provide AC power to meet the needs of legacy AC equipment in a physical infrastructure is desirable.

SUMMARY

A sizeable number of electronic equipment or devices still operate on AC power. Thus, a versatile power distribution system not only must deliver DC power to a DC power distribution circuit for use by solid-state electronics, it must also provide AC power to an AC power distribution circuit to meet the needs of legacy AC equipment in a household. Embodiments of the present disclosure provide such a versatile power in a co-existing AC and DC system.

Electronic devices may operate at different supply voltages. Thus, a DC power distribution system, in accordance with embodiments of the present disclosure, advantageously supplies different DC voltages to different DC power distribution circuits for different electronic devices requiring different DC voltages. To achieve this, in accordance with embodiments of the present disclosure, is the incorporation of persistent DC circuit breakers in a power panel, where an AC circuit breaker in a power panel may be replaced by a persistent DC circuit breaker, which also converts an AC power distribution circuit to a DC power distribution circuit to provide the required DC voltage. Replacing a circuit breaker is cost-effective and highly flexible in distributing DC power. It also enables an AC power system to be converted into either a co-existing AC and DC power co-power system, or a DC-only power system.

One requirement of a DC power distribution circuit is that the DC power must be constantly and persistently available for use, regardless of the availability of external DC power source. In other words, the DC power is ideally a persistent power.

There are two techniques for ensuring a persistent DC power sourcing. The first technique is the use of a centralized AC-to-DC converter (ADC) in a power panel to generate DC powers for output to all DC power distribution circuits, where the centralized ADC is activated when the external or regenerated DC energy becomes unavailable.

The second technique is a distributive approach by incorporating an AC-to-DC power converter in a circuit breaker, thereby replacing an AC circuit breaker with a persistent DC circuit breaker. Similarly, the ADC in a persistent DC circuit breaker is activated only when an external DC power source is unavailable. A persistent DC circuit breaker outputs DC power consistently using the AC power for DC conversion.

A centralized ADC limits the number DC powers that can be supplied from the power panel to drive to all DC power distribution circuits connected to the power panel. Therefore, it may require additional DC-DC converters to connect to the DC power distribution circuit to increase or decrease the DC voltage.

The second technique is more flexible than the first technique. The conversion of an AC power distribution circuit to a DC power distribution circuit is also straightforward by replacing an AC circuit breaker with a persistent DC circuit breakers in a power panel. The same power interconnects in a building can be used either as an AC power distribution circuit or a DC power distribution circuit, depending upon whether an AC circuit breaker or a DC circuit breaker is selected in the power panel to drive the power distribution interconnects.

In addition, an AC power distribution circuit can be leveraged to supply either up to two different DC voltages over the same power interconnects that supply 120V of AC power, or up to three different DC voltages over the same power interconnects that supply 240V of AC power. The neutral wire that carries return current for AC power distribution circuit can be leveraged to carry an additional DC voltage different from the DC voltage on the wire used for the AC phase line. The ground wire that carries no AC current in an AC power distribution circuit can be used as a DC current return path and may carry the highest DC current in a DC power distribution circuit.

BRIEF DESCRIPTION OF DRAWING

FIG. 2 illustrated an exemplary functional block diagram of a persistent single-DC circuit breaker with protection for power distribution circuit abnormalities.

FIG. 3 shows an exemplary functional block diagram of a persistent dual-DC circuit breaker with fault protection feature.

DETAIL DESCRIPTIONS

Figure 1:
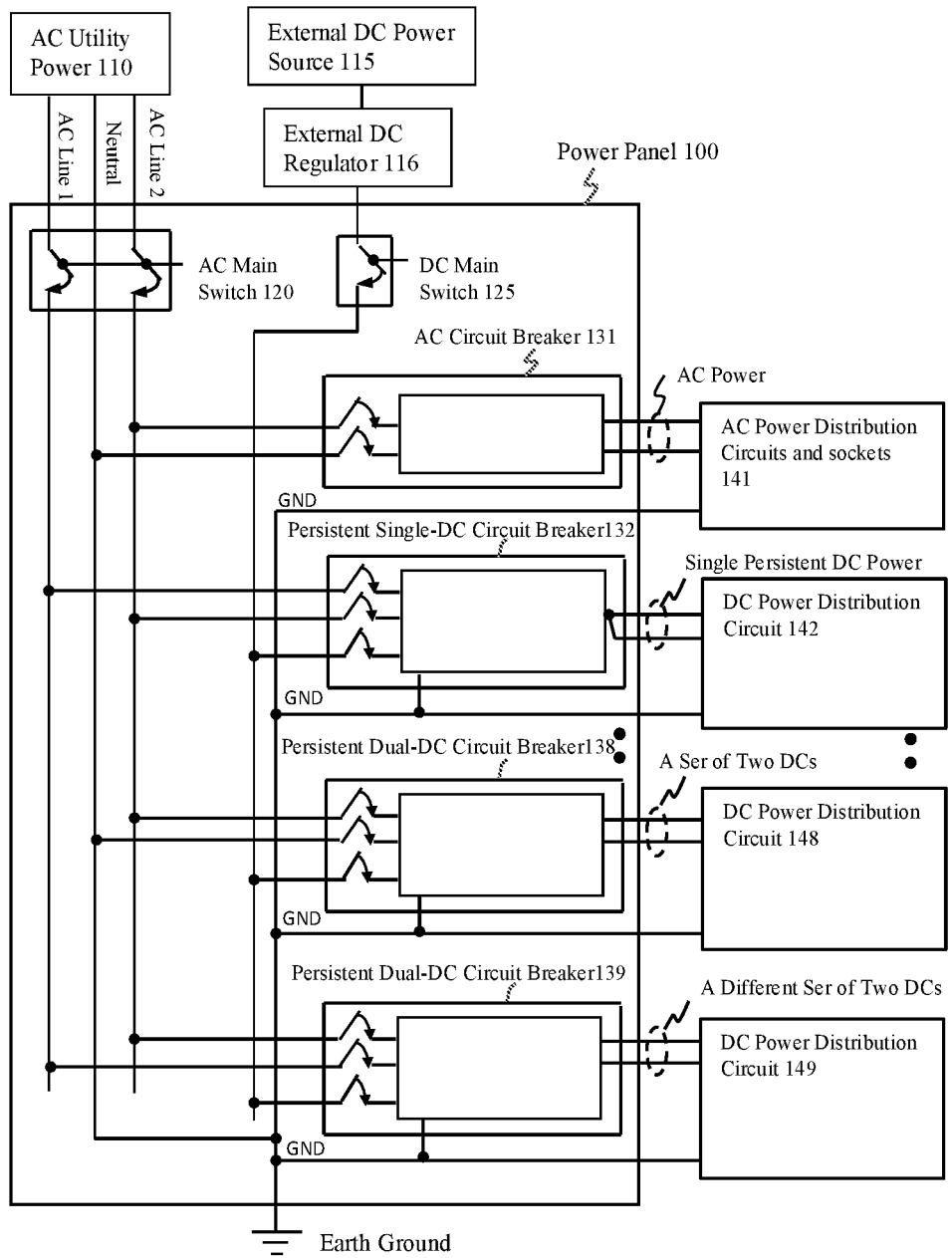
FIG. 1 shows an exemplary AC and persistent DC co-existing power panel incorporated with AC and persistent DC circuit breakers.

In accordance with embodiments of the present disclosure, DC power is directly supplied on a power distribution circuit to power electronic devices, such as mobile phone or laptops. To achieve this, in accordance with one embodiment, a power panel provides DC power for electric devices, while also providing AC power to meet the needs of legacy AC equipment in a physical infrastructure. Embodiments of the present disclosure therefore eliminate the need for power adaptors while concurrently supporting the existing legacy AC equipment in a building, so as to efficiently use the regenerated energy.

A co-existing AC and persistent DC power panel provides both AC and DC powers in a building. An AC power panel can be converted into an AC and DC co-existing power panel by replacing its AC circuit breaker with a persistent DC circuit breaker. FIG. 1 shows an exemplary configuration of such a power panel 100. A DC input from external DC power source 115 is connected to the panel. The external DC power source 115, such as the energy regenerated by solar panels or the energy stored in a battery pack may be regulated by a voltage regulator 116 prior to being applied to the power panel 100. The DC power input to the power panel 100 can be switched off manually by a DC main switch 125.

There is also an AC main switch 120 to control the input of AC power to AC circuit breakers and DC circuit breakers in the power panel 100. The AC power is the main power for AC circuit breakers. However, the AC power is an auxiliary power for the persistent DC circuit breakers. The AC power input typically includes two phase-lines and a neutral in the US, where a phase line and the neutral provide a 120V AC power. The two phase-lines provide a 240V AC power to meet higher power requirement.

In the exemplary embodiment shown in FIG. 1, the AC circuit breaker 131 distributes AC power to AC power distribution circuit 141. The persistent dingle-DC circuit breaker 132 distributes single DC voltage for DC power distribution circuit 142, and the persistent dual-DC circuit breakers 138, 139 distribute two DC voltages for DC power distribution circuits 148, 149. The voltages on the two DC power distribution circuits 148, 149 may be different.

The interchange of an AC circuit breaker and a persistent DC circuit breaker enables the conversion between an AC power distribution circuit and a DC power distribution circuit. An AC power, a single-DC power, or dual-DC powers can be distributed to a power distribution circuit with a proper selection or replacement of circuit breaker at a circuit breaker slot in power panel. It is flexible to configure the power output in a co-existing AC and persistent DC power system at a relatively low cost. A persistent DC circuit breaker may also be programmable to output different DC voltage for use.

In an AC circuit breaker, ground wire is not switched, nor is ground switched in a DC circuit breaker. Ground is connected to an AC power distribution circuit for safety concern. However, ground is connected to a socket on DC power distribution circuit to provide ground voltage reference for DC device plugged on the socket, and to provide a current return path for the DC power distribution circuit.

FIG. 2 shows an exemplary functional block diagram of a persistent single-DC circuit breaker. A persistent DC circuit breaker refers to an uninterrupted availability of a substantially constant and consistent DC voltage by the circuit breaker for use, regardless of the availability of external regenerated DC powers.

An AC power switch 211 and a DC power switch 212 are included in the persistent DC circuit breaker 200 shown in FIG. 2. Both can be manually controlled to connect the respective AC and DC power inputs to the circuit breaker 200. In FIG. 2, even if the AC switch 211 is manually switched off, the persistent DC circuit breaker 200 can still output DC power as long as an external DC energy is available. When the DC switch 212 is manually switched off or is without a connection to an external DC power source, the persistent DC circuit breaker 200 can still provide DC power continuously if AC power is provided to power up its embedded ADC 235. Only when the AC switch 211 and the DC switch 212 are both manually switched off, then the persistent DC circuit breaker is unable to output DC power. The persistent DC circuit breaker 200 includes a persistent DC power module 205, which the control circuit to empower a persistent DC circuit breaker 200 to provide persistent DC power.

In FIG. 2, an external DC input 215 through the DC power switch 212 is provided to the persistent single-DC power module 205. The external DC input 215 is regulated by a DC regulator 225 to a voltage required by a DC power distribution circuit connected to the circuit breaker 200.

There is an AC auto switch 220 in the persistent DC power module 205, which can be automatically switched on or off to enable the AC input 210 to the DC power module on demand under the control of a voltage monitoring device, i.e. an AC switching control comparator 230. The AC switching control comparator monitors the availability and strength of external DC power source by comparing its attenuated input with a reference voltage, such as reference voltage Vrefa. A voltage divider may be applied to attenuate the DC input 215 to a voltage level compatible with the device supply voltage VCC. The VCC can be derived from a rechargeable battery, or is generated through a DC-DC regulator using the DC power 215, or with an AC-DC regulator taking AC power as input, or even an external VCC input to the circuit breaker.

If the attenuated DC input is higher than Vrefa, then the comparator 230 will output a high. The output of inverter 231 will remain low without impacting the normally-open (NO) AC auto switch 220, which will continue to stay in its default state as normally-open (NO). The output of AC manual switch 211 may be ANDed with the inverter 231 output to control the switching of AC auto switch 220. Also, the AC manual switch 211 may be connected at the phase line in serial with the AC auto switch 220.

When the external DC input 215 weakens and its attenuated input drops below Vrefa, the AC switching control comparator will change its output to a low. A change to a high level at the inverter 231 output will close the normally-open AC auto switch 220 to enable the AC input 210 to power the embedded ADC 235. The AC auto switch 220 may be a solid-state relay (SSR) or an electromagnetic relay (EMR) using bipolar or MOSFET to control its switching.

The output of ADC 235 is also regulated to a voltage in the same manner as the regulated output of DC regulator 225 to ensure a constant DC voltage is available from the persistent DC circuit breaker 200. The reference voltage Vrefr is used as a control voltage to ensure the same regulated output voltage from the DC regulator 225 and the regulator in ADC 235.

There is another voltage detection device 232, such as the output switching control comparator, which compares an attenuated DC voltage from DC input 215 with a reference voltage Vrefo. When the attenuated DC input falls below Vrefo, the output switching control comparator 232 will change state from high to low. The output of inverter 233 thus changes from low to high to cause the regulated ADC output to be transferred to the DC output port 250 with the close of a normally-open (NO) DC switch 241; at the same time the output of comparator 232 will cause the normally-open DC switch 240 to return to open to disconnect the output of DC regulator 225 to the DC output port 250.

The DC switch 240, 241 may be a load switch including MOSFET device to control DC switching. A solid-state DC switch can be implemented to be normally-open if an enhancement mode MOSFET is used in its transfer gate. Alternatively, it can be implemented to be normally-closed if a depletion mode MOSFET is used in its transfer gate. Positive logic is used throughout the entire depiction for clarity. A SSR or EMR may also be used as a DC switch.

The pair of DC switches 240, 241 are used to select either the regulated DC voltage from the external DC input 215 or to select the ADC 235 converted voltage for output to the persistent DC circuit breaker 200 can be replaced by a DC multiplexer (or alternatively a DC mux), where the output of the DC regulator 225 is transferred to the output of DC mux when the output switching control comparator 232 outputs a high, and the regulated output of ADC 235 is transferred to the DC mux output when the output switching control comparator 232 outputs a low.

The voltage level of Vrefo is lower than that of Vrefa. This ensures the AC auto switch 220 is turned on in advance to power up ADC 235 when external DC input 215 starts to drop. However, Vrefo is higher than Vrefr. This ensures the DC regulator 225 is charged up in advance by external DC input 215 before the pair of DC switches 240, 241 change states to enable the regulated output from DC regulator 225 to be supplied at the output of persistent DC circuit breaker 200. A persistent DC power is thus supplied from the persistent DC circuit breaker 200 at same constant DC voltage all the time.

The reference voltage Vrefa, Vrefo and Vrefr may be programmable to meet the reference voltage requirement. Alternatively, a single reference voltage, i.e. the highest one Vrefa, can be selected for the persistent DC power module 205, and then to step the voltage down to Vrefo, and further to step the voltage down to Vrefr, to maintain a fixed voltage difference among the set of reference voltages. The Vrefa can also be a pre-determined fixed value programmed in the DC circuit breaker 200 when the voltage to be output from the DC circuit breaker 200 is known.

The circuit breaker shuts off its power output in case any distribution circuit abnormality takes place, such as short circuit, electric arc, over-voltage, or over-heat. To achieve this, a DC fault protection logic 245 implemented in the persistent DC power module 205 includes a fault detection or fault protection circuit 246, which monitors the output of DC circuit breaker 200 to detect if any circuit abnormality takes place in the DC power distribution circuit it drives. The inverted output from inverter 247 connected to the fault protection circuit 246 will open both DC circuit switches 240, 241 in case of any abnormality encountered in the power distribution circuit.

The output of the DC power mux, if used to replace the pair of DC switches 240,241, will also be disconnected from the output of DC circuit breaker 200 as well, in case any circuit abnormally takes places in the DC power distribution circuit connected to the circuit breaker 200.

The persistent single DC power module 205 which includes control circuits to facilitate the input DC power detection, power regulation, power conversion, and circuit fault protection can be implemented or fabricated in a multi-chip package (MCP), or as one or more integrated circuits to be included in the DC circuit breaker which requires a compact physical size.

FIG. 3 shows an exemplary functional block diagram of a persistent dual-DC circuit breaker 300, in accordance with one embodiment of the present disclosure. A persistent dual-DC power module 305 is included in such a circuit breaker 300 as the main control circuit. A persistent dual-DC power module can be implemented by grouping together two persistent single-DC power modules as shown in FIG. 2. Similarly, it can be implemented as a MCP or fabricated as one or more integrated-circuits to provide dual-DC powers.

As described above, an AC power distribution circuit is leverageable for use as dual-DC power delivery. A double-pole, single-throw (DPST) manual switch 311 can be selected to switch off the pair of phase lines from AC input 310 in a persistent dual-DC circuit breaker 300. Alternatively, two individual SPST switches may be selected to switch off two phase lines in AC input 310 to the persistent dual DC circuit breaker 300, where each SPST switch controls a 120V AC power input to a respective ADC 335 or 336. Alternatively, both phase lines may be supplied to a single ADC to generate two regulated DC voltages.

By incorporating a centralized ADC in power panel, all circuit breakers connected to the power panel mainly function as mechanical switch. This is different from embodiments of the present disclosure that have an ADC embedded in each DC circuit breaker that operates as an active DC circuit breaker with respective automatic control function.

The ADC increases the flexibility in configuring a DC power panel to provide the required DC powers for respective DC power distribution circuits. A distributive DC circuit breaker provides more flexibility to provide different DC output voltages for use A persistent DC circuit breaker may have more flexibility to have a different output voltage, if its regulator control reference voltage Vrefr is adjustable or programmable.

With a removable persistent DC circuit breaker, an existing AC power panel can be configured as an AC power panel, a co-existing AC and DC power panel, or a persistent DC power panel by replacing the circuit breaker in power panel. An external DC power is required to input to a persistent DC power panel, regardless of a centralized or a distributive approach. In the distributive approach, each persistent DC circuit breaker requires an additional DC connection on each circuit breaker. A proper connector may be included in the persistent DC power panel for the external DC power to plug to receive the DC power input to the circuit breaker.

I claim:

1. An apparatus adapted to provide a persistent DC power, the apparatus comprising:
    an AC power input port coupled to an AC power supply via an AC manual switch;
    a DC input port coupled to an external DC power via a DC manual switch;
    a DC output port; and
    a persistent DC power module coupled to the DC output port, comprising:
        a DC voltage regulator, wherein the external DC power received from the DC input port is regulated in accordance with a first reference voltage to generate a regulated DC voltage;
        an AC-to-DC converter (ADC) adapted to convert the AC power supply received from the AC power input port to a converted DC voltage in accordance with the first reference voltage; and
        a control circuit comprising a first comparator adapted to compare the external DC power with a second reference voltage, wherein the second reference voltage is higher than the first reference voltage, wherein the first comparator outputs a logic high level when the external DC voltage is higher than the second reference voltage: the control circuit adapted to:
            enable the regulated DC voltage to be delivered to the DC output port when the first comparator output is at the logic high level, and
            enable the converted DC voltage to be delivered to the DC output port when the first comparator output is not at the logic high level; and
        wherein the AC power input port is further coupled to an AC auto switch controlled by a second comparator adapted to compare the external DC voltage with a third reference voltage, wherein the third reference voltage is higher than the second reference voltage, wherein the second comparator is adapted:

to enable the AC power supply to supply power to the ADC when the second comparator output is at a logic low level, and to inhibit the AC power supply from supplying power to the ADC when the second comparator output is at a logic high level.

2. The apparatus of claim 1 wherein the control circuit further comprises:

a first and a second DC switches, wherein when output of the first comparator is at the logic high level, the first DC switch connects the regulated DC voltage to the DC output port and the second DC switch disconnects the converted DC voltage from the DC output port, and when output of the first comparator is not at the logic high level, the first DC switch disconnects the regulated DC voltage from the DC output port and the second DC switch connects the converted DC voltage to the DC output port.

3. The apparatus of claim 1, wherein when an output of the first comparator is at a logic high level, the regulated DC voltage is delivered to the DC output port, and when the output of the first comparator is at a logic low value, the converted DC voltage is delivered to the DC output port.

4. The apparatus of claim 1 wherein the first reference voltage is programmable to adjust output voltage of the persistent DC power module.

5. The apparatus of claim 1 wherein the third reference voltage is higher than the second reference voltage and the second reference voltage is higher than the first reference voltage.

6. The apparatus of claim 1 wherein the first reference voltage and the second reference voltage are generated from the third reference voltage and are smaller than the third reference voltage.

7. The apparatus of claim 1 wherein the persistent DC power module is formed in one or more integrated circuits.

8. The apparatus of claim 1, wherein the persistent DC power module is formed in a multi-chip module (MCP).

9. The apparatus of claim 1, wherein the persistent DC power module is assembled with a set of discrete devices.

10. The apparatus of claim 1, where the AC manual switch and the AC auto switch are connected in serial on phase line input of the AC power supply.

11. The apparatus of claim 1, where the AC auto switch is gated by output of AC manual switch to disable the AC auto switch.

12. The apparatus of claim 3, further comprising a fault protection circuit in the persistent DC power module to monitor abnormality on power distribution circuit connected to the DC output port and to inhibit supply of the regulated DC voltage and the converted DC voltage to the DC output port when circuit abnormality takes place.

13. The apparatus of claim 2, further comprising a fault protection circuit in the persistent DC power module to monitor abnormality on power distribution circuit connected to the DC output port and to disconnect outputs of the first and the second DC switches to the DC output port when circuit abnormality takes place.

14. The apparatus of claim 13, wherein the fault protection circuit detects circuit abnormal events of short circuit, electric arc, over-voltage, and over-heat to protect devices connected to the DC output port from being damaged.

15. The apparatus of claim 13 forms a persistent single-DC circuit breaker to distribute single DC power for power distribution circuit connected to the apparatus.

16. The apparatus of claim 1 further comprising:

a second persistent DC power module coupled to a second DC output port and comprising:

a second DC voltage regulator, wherein the external DC power received from the DC input port is regulated in accordance with a fourth reference voltage to generate a second regulated DC voltage;

a second AC-to-DC converter adapted to convert the AC power supply received from the AC power input port to a second converted DC voltage in accordance with the fourth reference voltage; and a second control circuit adapted to monitor the external DC power with a fifth second reference voltage, the second control circuit of the second persistent DC power module is adapted to:

enable the second regulated DC voltage to be delivered to the second DC output port when the external DC power is detected as being higher than the fifth reference voltage, and enable the second converted DC voltage to be delivered to the second DC output port when the external DC power is detected as being lower than the fifth reference voltage.

17. The apparatus of claim 16 further comprising a double-pole, single-throw switch to manually control on/off of two phase-lines in the AC power supply.

18. The apparatus of claim 16 wherein the persistent DC power module and the second persistent DC power module are disposed in AC and persistent dual-DC co-existing power panel.

19. The apparatus of claim 1 wherein the AC auto switch is selected from a group consisting of a solid-state relay, or an electromagnetic relay formed using either bipolar or MOSFET transistors as switching control.

20. The apparatus of claim 1 further comprising:

a second persistent DC power module coupled to a second DC output port and comprising:

a second DC voltage regulator, wherein a second external DC power received from the DC input port is regulated in accordance with a fourth reference voltage to generate a second regulated DC voltage;

a second AC-to-DC converter adapted to convert the AC power supply received from the AC power input port to a second converted DC voltage in accordance with the fourth reference voltage; and a second control circuit adapted to monitor the second external DC power with a fifth second reference voltage, the second control circuit of the second persistent DC power module is adapted to:

enable the second regulated DC voltage to be delivered to the second DC output port when the second external DC power is detected as being higher than the fifth reference voltage, and enable the second converted DC voltage to be delivered to the second DC output port when the second external DC power is detected as being lower than the fifth reference voltage.

* * * * *